United States Patent [19]
Ackermann

[11] Patent Number: 5,515,275
[45] Date of Patent: May 7, 1996

[54] CONTROL SYSTEM FOR STEERING A ROAD VEHICLE HAVING BOTH FRONT-WHEEL STEERING AND REAR WHEEL STEERING

[75] Inventor: Jürgen Ackermann, Herrsching, Germany

[73] Assignee: Deutsche Forschungsanstalt für Luft- und Raumfahrt e.V., Köln, Germany

[21] Appl. No.: 338,175

[22] Filed: Nov. 9, 1994

Related U.S. Application Data

[63] Continuation of Ser. No. 25,241, Mar. 2, 1993, abandoned.

[30] Foreign Application Priority Data

Mar. 3, 1992 [DE] Germany .................. 42 06 654.9

[51] Int. Cl.⁶ .................. G06F 7/70; B62D 5/06
[52] U.S. Cl. .................. 364/424.05; 364/424.01; 364/426.02; 180/142; 180/140; 180/197; 180/79.1; 280/91; 303/147
[58] Field of Search .................. 364/424.05, 426.02, 364/426.03, 424.06, 426.01; 180/142, 140, 79.1, 197, 141, 178, 170; 280/91; 303/100, 95, 96, 9.62, 103, 111; 477/108, 903; 73/182, 861.66, 146.2

[56] References Cited

U.S. PATENT DOCUMENTS

| | | | |
|---|---|---|---|
| 4,566,718 | 1/1986 | Kanai et al. | 280/708 |
| 4,811,807 | 3/1989 | Schier | 180/141 |
| 4,837,694 | 6/1989 | Narita et al. | 364/424.05 |
| 4,878,557 | 11/1989 | Shibahata et al. | 180/140 |
| 4,967,865 | 11/1990 | Schindler | 364/426.02 |
| 4,970,647 | 11/1990 | Karadsheh et al. | 364/424.05 |
| 4,998,593 | 3/1991 | Karnopp et al. | 364/426.02 |
| 5,001,636 | 3/1991 | Shiraishi et al. | 304/424.05 |
| 5,080,185 | 1/1992 | Kondo et al. | 180/140 |
| 5,094,127 | 3/1992 | Ishida et al. | 477/108 |
| 5,316,099 | 5/1994 | Inoue et al. | 364/426.02 |
| 5,388,658 | 2/1995 | Ando et al. | 364/426.03 |
| 5,402,341 | 3/1995 | Liubakka et al. | 364/424.05 |

FOREIGN PATENT DOCUMENTS

| | | |
|---|---|---|
| 3831932 | 4/1989 | Germany . |
| 4028320 | 3/1992 | Germany . |
| 9014980 | 12/1990 | WIPO . |

OTHER PUBLICATIONS

Ackermann, *Robust Car Steering By Yaw Rate Control*, 29th IEEE Conferernce on Decision and Control, vol. 4, pp. 2033–2034, Dec. 5–7, 1990.

Ackerman, *Robust Yaw Damping of Cars with Front and Rear Wheel Steering*, 31st IEEE Conference on Decision and Control, vol. 3, pp. 2586–2590, Dec. 16–18, 1992.

Ackermann et al, *Robust Yaw Damping of Cars with Front and Rear Wheel Steering*, IEEE Transactions on Control Systems Technology, vol. 1, No. 1, pp. 15–20, Mar. 1993.

*Primary Examiner*—Kevin J. Teska
*Assistant Examiner*—Jacques H. Louis-Jacques
*Attorney, Agent, or Firm*—Browdy and Neimark

[57] ABSTRACT

A control system for steering a road vehicle having front-wheel and rear-wheel steering, comprising a wheel base l (in m), a rear cornering stiffness $c_h$ (in N/rad), a center of gravity distance $l_v$ (in m) from the front axle and a mass m (in kg) and provided with a decoupled control circuit, a predetermined yaw damping $D_G$ is adjusted according to a damping parameter $$K_D = 2 D_G \sqrt{\frac{m \cdot l_v}{c_h}} \quad \text{(in s)}$$

via the steering of the rear wheels through an angle $\delta_h$ (in rad). Herewith the yaw rate r (in rad/s), travelling velocity v (in m/s) and steering wheel angle $\delta_L$ (in rad) are measured and the angle $\delta_h = (1/v - k_D)(w_h - r)$ is calculated by a microprocessor, whereby $w_h$ is formed as command variable from the measured steering wheel angle ($\delta_L$) by a prefilter ($F_h$) associated with the rear-wheel steering.

7 Claims, 1 Drawing Sheet

CONTROL SYSTEM FOR STEERING A ROAD VEHICLE HAVING BOTH FRONT-WHEEL STEERING AND REAR WHEEL STEERING

This application is a continuation of application Ser. No. 08/025,241, filed Mar. 2, 1993 abandoned.

BACKGROUND OF THE INVENTION

1. Field of the Invention

The invention relates to a method of steering a road vehicle having front-wheel and rear-wheel steering.

2. Description of the Prior Art

The steering behaviour of road vehicles is governed substantially by the dynamics of the yaw movement, i.e. rotational movement about the vertical axis through the centre of gravity of the vehicle. The dynamics of the yaw movement can be represented by a linear system of the second order. The movement variation depends decisively on the damping of the given values of this system, referred to hereinafter briefly as "yaw damping". The yaw damping of road vehicles in turn decreases with increasing velocity (see for example M. Mitschke, Dynamics of Motor Vehicles, Volume C, Road Holding, 2nd Edition, Springer-Verlag 1990, p. 58, FIG. 12.2).

Inadequate yaw damping at medium and higher speeds can considerably impair the roadworthiness. For example, critical situations occur when the vehicle is caught by a side wind or when the steering is disturbed by pot-holes or remnants of ice and snow. Due to his reaction time, in such cases the driver does not always succeed in stabilizing the unexpectedly occurring weakly damped yaw movement. Once this has resulted in a relatively large yaw movement the limits of the lateral tyre forces are quickly exceeded.

On the other hand, the yaw damping should not be too large because the vehicle reaction is otherwise felt to be "sluggish" by the driver.

A first generation of four-wheel steered vehicles is known still operating solely in controlled manner; a structure of such a four-wheel steered vehicle is shown in the block circuit diagram of FIG. 2. In the latter, the following symbols are employed:

$\delta_v(\delta_h)$ steering angle front (rear)

$\delta_L$ steering wheel command (steering wheel angle×steering wheel reduction)

$F_h$ amplification factor for driving the rear-wheel steering $\delta$ side-slip angle r yaw angle $a_v$ transverse acceleration of the front axle.

The mechanical relationship of the steering wheel to the steering angle $\delta_v$ of the front wheels is not changed. The rear steer angle $\delta_h$ is in the simplest case controlled proportionally to the steering angle $\delta_v$, i.e.

$$\delta_h = F_h \delta_v \qquad (1)$$

Usually, the amplification factor $F_h$, the so-called "steering ratio", is made variable, in dependence upon quantities measured in the vehicle, for example travelling velocity, yaw rate, transverse acceleration. Instead of an amplification factor $F_h$ dynamic prefilters having a transfer function $F_h(s)$ are also used. The symbol s here denotes the complex variable off the Laplace transformation. In an article by E. Donges, R. Aufhammer, P. Fehrer and T. Seidenfuβ "Function and safety concept of active rear axle kinematics of BMW", Automobiltechnische Zeitschrift 1990, p. 580–587, the transfer function $F_h(s)$ is given in the following form:

$$F_h(s) = P_r \frac{1 + T_D s}{1 + T_I s} \qquad (2)$$

Filter parameters $P_r$, $T_D$ and $T_I$ are calculated from the condition that a side-slip angle of zero is to be achieved. The filter parameters indicated above depend on the travelling velocity, the vehicle mass and the cornering stillnesses, which vary during operation of the vehicle. For example, the filter parameters $T_D$ and $T_I$ are proportional to the travelling velocity v. It is prior art here in automobile construction to measure the travelling velocity v and employ this for adaptation of filter parameters during operation.

A second generation of four-wheel steered vehicles employs a subordinate closed-loop control for the rear-wheel control whilst the front-wheel steering still has a conventional configuration. An example of this is the Toyota Soarer, which has been on the Japanese market since April, 1991 (cf. Hideo Inuoue, Hiroshi Harada and Yuiji Yokoja "Allradlenkung im Toyota Soarer", Congress "Four-wheel steering in automobiles", Haus der Technik, Essen, 3.-4.12.91). Here, the yaw rate r is measured with a relatively cheap vibration gyro and fed back to the rear-wheel steering; via a dynamic controller with a transfer function $H_h(s)$. Once again the symbol s here is the complex variable of the Laplace transformation. The result is a structure according to FIG. 3. The command variable $w_h$ of the subordinate control circuit is once again formed by a pre-filter $F_h(s)$ adapted in accordance with the velocity.

By the feedback of the yaw rate r to the rear-wheel steering the eigenvalues of the steering dynamics can be varied and the influence of external interfering variables, for example side wind, ice on the edge of the road, road inclination, etc., can be reduced. The rear-wheel steering $H_h$ is now actuated on the basis of external disturbances as well and not only on the basis of steering wheel commands given by the driver. The compensator $H_h(s)$ is designed specifically to the vehicle, and a satisfactory compromise must be found for various travelling velocities, loads and adhesion conditions between the tyres and road surface.

The necessary compromises introduced are facilitated if a subordinate closed-loop control is provided for the front-wheel steering as well. This results in a block circuit diagram according to FIG. 1. A controller $H_v(s)$ for the front-wheel steering must also be configured specifically to the vehicle. Such a structure of the steering control system is described for example by El-Deen and A. Seirig, "Mechatronics for Cars: Integrating machines and electronics to prevent skidding on icy roads", Computers in Mechanical Engineering 1987, p.10–22.

Due to the use of subordinate control circuits the steering angle of a wheel is made up of two components. One component is effected by steering commands given by the driver and the other by external disturbances (side wind, uneven road surface, etc.). Fundamentally, a distinction can thus be made between two control objectives, i.e.

(a) an automatic control of the yaw motion and (b) a track guide control by the driver in which he minimizes the lateral deviation from his intended track with steering wheel movement. For this track guide control in particular the "steering transfer function" L(s) is of interest, describing the relationship between the steering command and the transverse acceleration of the front axle.

The two control objectives are however generally highly intercoupled in a control system according to FIG. 1. Both in the design of the two controllers $H_v(s)$ and $H_h(s)$ and in their adaptation to the operating conditions during travelling, any change of a controlled parameter produces both changes of the steering transfer function and changes in the yaw damping and yaw frequency.

The two control objectives can be decoupled from each other by a subordinate control of the front-wheel steering with $$H_v(s)=1s \qquad (3)$$

as explained in detail in U.S. patent application Ser. No. 07/753594. As a result of this decoupling the driver need only keep a mass point (imaginary at the front axle) on his intended path by lateral acceleration $a_v$ of the front axle. The yaw movement is automatically regulated and has no influence on the track guide task of the driver. The decoupling control rule thus need not be made specific to the vehicle, in contrast to all previously known controllers; on the contrary, it is governed clearly by equation (3). This decoupling is the basis of a specific variation of the yaw dynamics without simultaneously influencing the steering transfer function.

A disadvantage in all the steering control systems set forth above is that the yaw damping changes with the vehicle velocity. Since however a low damping impairs roadworthiness, it is particularly critical that the yaw damping decreases with increasing velocity.

SUMMARY OF THE INVENTION

The invention therefore has as its object to provide a method of steering a road vehicle having front-wheel and rear-wheel steering in which the yaw damping is made independent of the vehicle velocity and thus the possibility is created of achieving a favourable value of the yaw damping in the entire velocity range.

The invention therefore proposes in a method of steering a road vehicle having front-wheel and rear-wheel steering, comprising a wheel base l (in m), a rear cornering stiffness $c_h$ (in N/rad), a centre of gravity distance $l_v$ (in m) from the front axle and a mass m (in kg), in which by an integrating feedback of a measured yaw rate signal to the front-wheel steering the yaw motion is decoupled from the lateral motion of the front axle, the problem in the steering thereby being split into two subproblems to be solved separately, that is into a lateral track guiding of the front axle by a signal generated by a driver with the steering wheel and an automatic control of the yaw motion, and the eigenvalues of the yaw motion can be shifted as desired by feedback of the measured yaw rate signal to the rear-wheel steering in such a manner that the choice of the yaw eigenvalues has no influence on the steering transfer function from the steering wheel to the lateral motion of the front axle, the improvement in which a predetermined yaw damping $D_G$ is achieved by means of a damping parameter $$K_D = 2 D_G \sqrt{\frac{m \cdot l_v}{c_h}} \quad (\text{in } s)$$

via the steering of the rear wheels through an angle $\delta_h$ (in rad), the yaw rate r (in rad/s), travelling velocity v (in m/s) and steering wheel angle $\delta_L$ (in rad) being measured and $$\delta_h = (l/v - k_D)(w_h - r)$$

calculated by means of a microprocessor, and $w_h$ is formed as command variable from the measured steering wheel angle ($\delta_L$) by a prefilter ($F_h$) associated with the rear-wheel steering.

An advantageous further development is set forth in the subsidiary claim.

By the decoupling in the front-wheel steering according to equation (3) the subsystem of the second order from which the yaw damping $D_G$ relates can be analyzed on its own. This analysis leads to a specific structure for the controller $H_h(s)$ with an amplification adaptation by the vehicle velocity v. The controller $H_h(s)$ firstly contains a single free parameter, that is the damping parameter $K_D$. (Initially, as long as $K_D$ is not determined, it will be referred to as "structural controller statement"). This controller structure has the properties set forth below:

(a) The yaw damping $D_G$ is independent of the vehicle velocity and (b) the numerical value of the yaw damping $D_G$ can be adjusted by the choice of the damping parameter $k_D$ in such a manner that an adjustment of the damping parameter $k_D$ does not have any influence on other properties of the steering dynamics, for example on the natural frequency of the yaw motion or on the steering transfer function from the steering wheel to the lateral acceleration of the front axle.

BRIEF DESCRIPTION OF THE DRAWINGS

Hereinafter the invention will be explained in detail with reference to the attached drawings, wherein.

DESCRIPTION OF THE PREFERRED EMBODIMENTS

Figure 1:
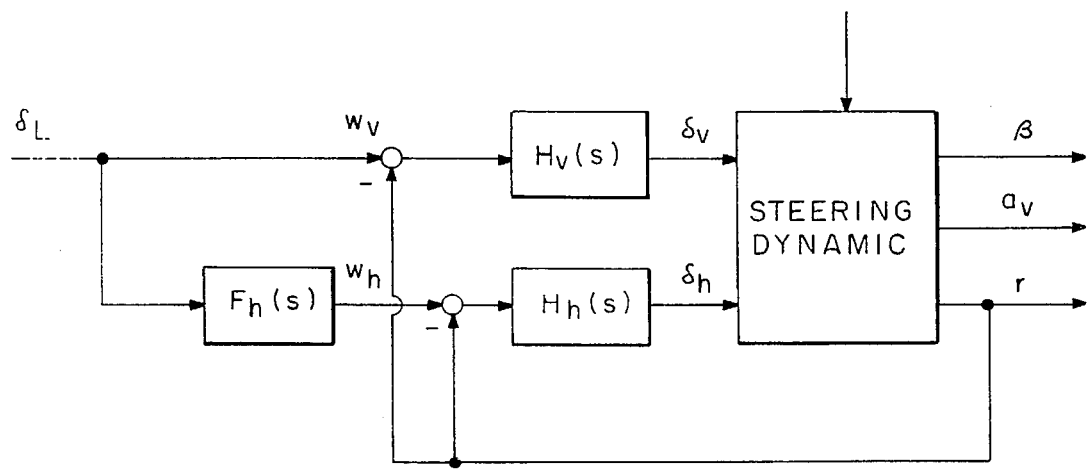
FIG. 1 shows a block circuit diagram of a structure of a four-wheel steering with a subordinate feedback of the yaw rate to the front-wheel and rear-wheel steering.
Figure 2:
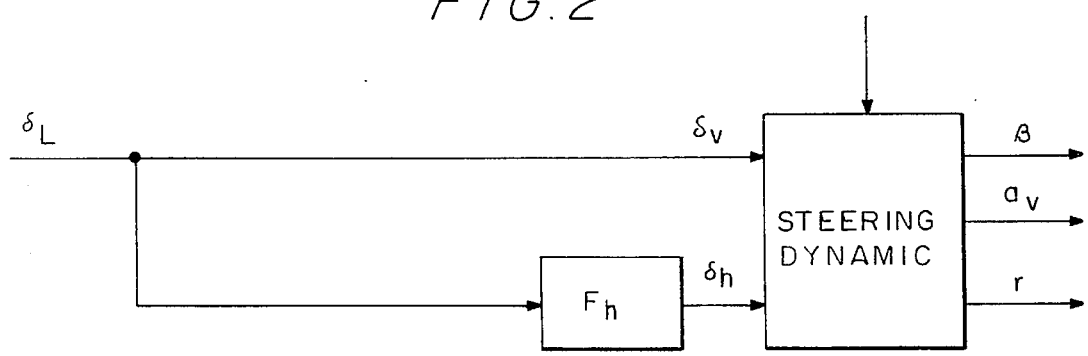
FIG. 2 shows a block circuit diagram of a conventionally controlled four-wheel steering still operating solely with open control.
Figure 3:
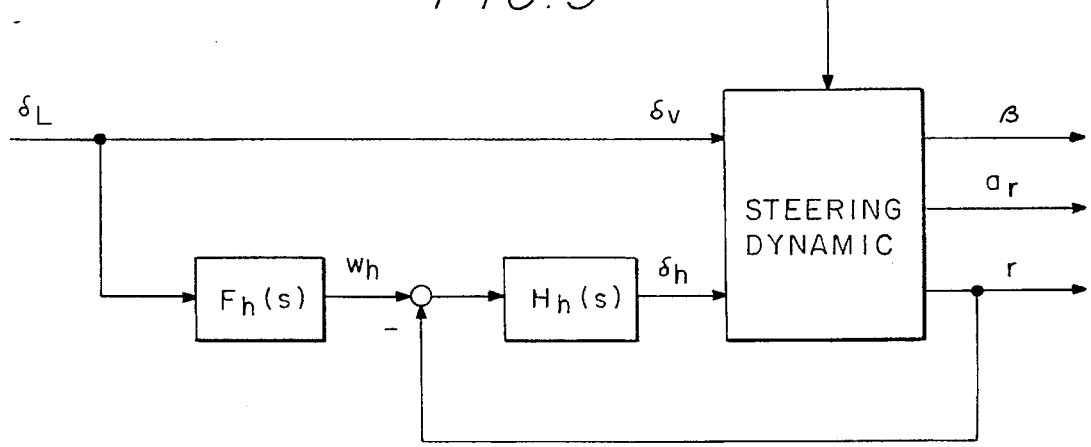
FIG. 3 is a block circuit-diagram of a conventional four-wheel steering with subordinate feedback of the yaw rate to the fear-wheel steering only.

A system for carrying out and implementing the method according to the invention may be made up substantially of commercially available components by using in particular commercially available sensors to measure vehicle velocity, yaw rate and steering wheel angle. As actuators for the steering of the front and rear wheels hydraulic or electrical drives may be employed as used in series production in the four-wheel steered vehicles of the companies Nissan, Toyota, Mitsubishi, Mazda, Honda, Daihatsu and BMW. In Germany, there are competing development lines being followed by Siemens/Rexroth, Bosch and Zahnradfabrik Friedrichshafen (cf. the lectures at the Congress Four-Wheel Steering Systems in Automobiles, Haus der Technik, Essen 3.-4.12.1991). The new method of velocity-independent yaw damping is implemented by combining known components with the aid of a novel controller structure. The necessary computing operations of the controller are carried out in a microprocessor.

In patent application P 40 28 320.8-21 for a vehicle having a decoupling steering control corresponding to equation (3) the following state representation denoted therein as equation (23) is given:

$$\begin{bmatrix} \dot{\alpha}_v \\ \dot{r} \\ \dot{\delta}_v \end{bmatrix} = \begin{bmatrix} d_{11} & 0 & 0 \\ d_{21} & d_{22} & d_{23} \\ 0 & -1 & 0 \end{bmatrix} \begin{bmatrix} \alpha_v \\ r \\ \delta_v \end{bmatrix} + \begin{bmatrix} c \\ 0 \\ 1 \end{bmatrix} w_v \quad (4)$$

(The command variable $w_v$ in the state representation equation (4) is referred to in the elder application as $r_{ref}$). The other state variables indicated above denote:

$a_v$ transverse acceleration of the front axle
r yaw rate
$\delta_v$ steering angle front.

The individual coefficients of the model are $$c = c_v/ml_h$$

$$d_{11} = -c/v$$

$$d_{21} = (c_h l_h - c_v l_v)/ml_v l_h$$

$$d_{22} = -c_h l/mvl_v$$

$$d_{23} = c_h/ml_v$$

wherein once again:

$c_v(c_h)$ cornering stiffness front (rear)
$l_v(l_h)$ centre of gravity distance from the front (rear) axle
l wheel base ($l=l_v+l_h$)
m vehicle mass (normalized by adhesion coefficients μ)
v vehicle velocity.

By decoupling the model according to equation (4) is broken down into two submodels:

$$\dot{\alpha}_v = d_{11}\alpha_v + cw_v \quad (5)$$

and $$\begin{bmatrix} \dot{r} \\ \dot{\delta}_v \end{bmatrix} = \begin{bmatrix} d_{22} & d_{23} \\ -1 & 0 \end{bmatrix} \begin{bmatrix} r \\ \delta_v \end{bmatrix} + \begin{bmatrix} d_{21} \\ 0 \end{bmatrix} \alpha_v + \begin{bmatrix} 0 \\ 1 \end{bmatrix} w_v \quad (6)$$

Equation (6) describes the yaw motion; the characteristic polynome for this is:

$$\begin{aligned} P_e(s) &= s(s-d_{22}) + d_{23} \\ &= \frac{c_h}{ml_v} + \frac{c_h l}{mvl_v} s + s^2 \end{aligned} \quad (7)$$

By comparing the formula $$P_e(s) = w_e^2 + 2D_e w_e s + s^2 \quad (8)$$

the natural frequency $w_e$ and the damping $D_e$ are obtained:

$$\omega_e = \sqrt{\frac{c_h}{ml_v}} \quad (9)$$

$$D_e = \frac{l}{2v}\sqrt{\frac{c_h}{ml_v}} \quad (10)$$

By the decoupling control of the front wheels the yaw damping assumes the value $D_G = D_e$.

With increasing vehicle velocity v the yaw damping $D_G$ therefore decreases. This effect can be compensated by a long wheel base l only in very narrow limits.

By using the rear-wheel steering the yaw damping $D_G$ is now made independent of the vehicle velocity. For this purpose, firstly the submodel according to equation (6) must be expanded by the additional regulated variable rearwheel steering angle $\delta_h$ $$\begin{bmatrix} \dot{r} \\ \dot{\delta}_v \end{bmatrix} = \begin{bmatrix} d_{22} & d_{23} \\ -1 & 0 \end{bmatrix} \begin{bmatrix} r \\ \delta_v \end{bmatrix} + \begin{bmatrix} d_{21} \\ 0 \end{bmatrix} \alpha_v + \begin{bmatrix} 0 \\ 1 \end{bmatrix} \omega_v + \begin{bmatrix} b_{22} \\ 0 \end{bmatrix} \delta_h \quad (11)$$

As set forth in the elder patent application by equation (23), the coefficient $b_{22}$ is:

$$b_{22} = -c_h/ml_v \quad (12)$$

The essential idea regarding a damping of the yaw motion is represented by the following structural controller statement:

$$\delta_h = (l/v - k_D)(w_h - r) \quad (13)$$

$w_h$ here is the command variable of the subordinate control circuit for the rearwheel steering as apparent from FIG. 1.

The quantities wheel base l, travelling velocity v and yaw rate r have already been introduced and $k_D$ is the only controlled parameter still to be determined. It will be shown below that (a) the controlled parameter $k_D$ is in a simple relationship with the yaw damping $D_G$ and (b) on the basis of the statement (13) the yaw frequency does not depend on $k_D$, (c) the yaw damping $D_G$ has become independent of the travelling velocity.

Insertion of equation (13) in equation (11) gives:

$$\begin{aligned} \begin{bmatrix} \dot{r} \\ \dot{\delta}_v \end{bmatrix} &= \begin{bmatrix} d_{22} - (l/v - k_D)b_{22} & d_{23} \\ -1 & 0 \end{bmatrix} \begin{bmatrix} r \\ \delta_v \end{bmatrix} + \begin{bmatrix} d_{21} \\ 0 \end{bmatrix} a_v + \begin{bmatrix} 0 & (l/v - k_D)b_{22} \\ 1 & 0 \end{bmatrix} \begin{bmatrix} w_v \\ w_h \end{bmatrix} \\ &= \begin{bmatrix} -k_D c_h/ml_v & c_h/ml_v \\ -1 & 0 \end{bmatrix} \begin{bmatrix} r \\ \delta_v \end{bmatrix} + \begin{bmatrix} d_{21} \\ 0 \end{bmatrix} a_v + \begin{bmatrix} 0 & (l/v - k_D)b_{22} \\ 1 & 0 \end{bmatrix} \begin{bmatrix} w_v \\ w_h \end{bmatrix} \end{aligned} \quad (14)$$

The characteristic polynome is now $$\begin{aligned} P_g(s) &= \frac{c_h}{ml_v} + \frac{k_D c_h}{ml_v} s + s^2 \\ &= \omega_g^2 + 2D_g \omega_g + s^2 \end{aligned} \quad (15)$$

The damping $D_g$ is $$D_g = \frac{k_D}{2}\sqrt{\frac{c_h}{ml_v}} \quad (16)$$

The yaw damping $D_G$ now assumes the value $D_g$ and is independent of the travelling velocity v. The yaw frequency $w_g$ is unchanged, i.e. $w_g = w_e$. It is not influenced by a change in the parameter $k_D$. According to equation (16) the damping parameter $k_D$ of the controller is $$k_D = 2D_G\sqrt{\frac{ml_v}{c_h}} \quad (17)$$

The damping parameter $k_D$ can be determined from the desired damping $D_G$. Favourable for example is a damping $D_G = 1/\sqrt{2}$. This then results in a value for the damping parameter $k_D$ of $$k_D = \sqrt{\frac{2ml_v}{c_h}} \qquad (18)$$

If the damping parameter $k_D$ is altered by the driver whilst the vehicle is moving this thus does not result in any change either of the yaw frequency $w_g$ or of the steering transfer function from the steering wheel to the lateral acceleration of the front axle, as apparent from the subsystem according to equation (5) arising from decoupling control of the front-wheel-steering. These statements are true when assuming a mass distribution corresponding to concentrated masses at the front and rear axles. With a differing mass distribution deviations from the ideal case illustrated arise.

After a corresponding choice of the damping parameter $k_D$ the controller rule according to equation (13) can be implemented with convention technical means in a microprocessor. The wheel base 1 here is known; the measurement of the vehicle velocity v and its use for adapting filter parameters is already employed in automobile construction, for example in the BMW 850i with four-wheel steering; as for example in the Toyota Sourer, the yaw rate r can be measured with a vibration gyro so that the microprocessor need only perform the four basic computing operations according to equation (13).

Since the damping parameter $k_D$ influences specifically only the yaw damping and in particular not the steering transfer function, there is no safety risk in adjusting $k_D$ when travelling. This can be done either by the driver, for example by a "comfortable-sport switch", or automatically in dependence upon the steering wheel angle, the yaw rate and other quantities measured in the vehicle.

I claim:

1. A steering system for a road vehicle which vehicle has steerable front wheels disposed proximal a front axle;

steerable rear wheels disposed behind the front wheels a distance 1 (in m), said distance being the wheel base;

a steering wheel rotatable to a steering wheel angle $\delta_L$ (in rad);

a mass m (in kg);

a center of mass located a distance $l_v$ (in m) behind the front axle; and a rear cornering stiffness $c_h$ (in N/rad);

said steering system comprising:

a front actuator means for controlling a front wheel steering angle $\delta_v$ in rad;

a rear actuator means for controlling a rear wheel steering angle $\delta_h$ in rad;

a yaw sensor means for generating a yaw signal r proportional to a yawing angular rotation rate of the vehicle (in rad/s);

a steering wheel angle sensor means for measuring the steering wheel angle $\delta_L$ (in rad);

a speedometer sensor for measuring vehicle velocity v in m/s; and a processor means for accepting the r, $\delta_L$, and v from said yaw sensor means, said angle sensor means and said speedometer and for controlling the front actuator and the rear actuator based thereon;

the processor means incorporating a first calculation for calculating $\delta_v$ as a first function of r such that a front axle transverse acceleration $a_v$ (in m/s) is a function of $\delta_L$ only, the first calculation including compensation for the yaw signal r, and means for causing the front actuator to dispose the front wheels to $\delta_v$, whereby steering is decoupled from yaw rate;

a second calculation for calculating a command variable $W_h$ and calculating $\delta_h$ as a second function $$\delta_h = (l/v - K_D)(W_h - r) \text{ (in rad)}$$

where $K_D$ is a parameter, and means for causing the rear actuator to dispose the rear wheels to $\delta_h$;

the first calculation and the second calculation being decoupled;

whereby yaw damping is independent of v and the yaw control does not affect the transfer function from the steering wheel to the front axle tracking.

2. The steering system according to claim 1, wherein $W_h$ is calculated from $\delta_L$ by a prefilter transfer function ($F_h$) associated with rear-wheel steering.

3. The steering system according to claim 1, wherein $$K_D = 2D_G \sqrt{\frac{ml_v}{C_h}} \text{ (in s)}.$$

4. The steering system according to claim 3, further comprising; a manual control accessible to a driver of the vehicle; and parameter input means for varying the parameter $K_D$ according to a setting of the manual control.

5. The steering system according to claim 3, further comprising;

automatic control means for varying the parameter $k_D$.

6. The steering system according to claim 1, wherein the yaw signal is proportional to a yawing angular acceleration of the vehicle.

7. The steering system according to claim 1, wherein the first process integrates r with respect to time.

\* \* \* \* \*